Oct. 3, 1933.    K. SCHMIDT    1,929,390
FOAM DELIVERY APPARATUS
Filed May 13, 1930
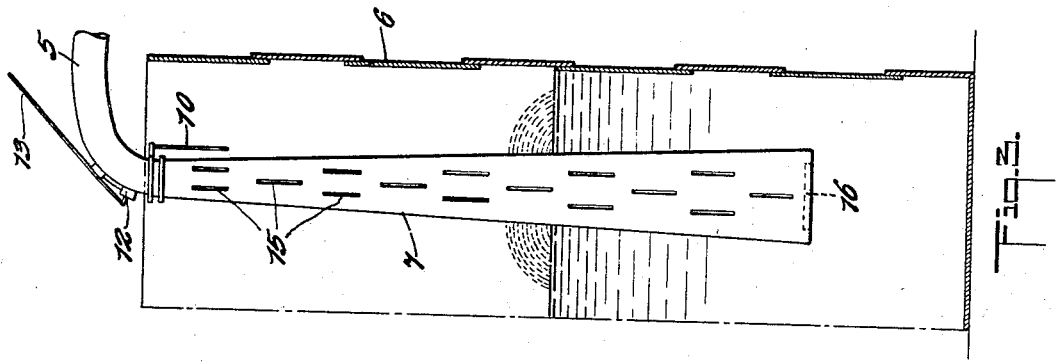
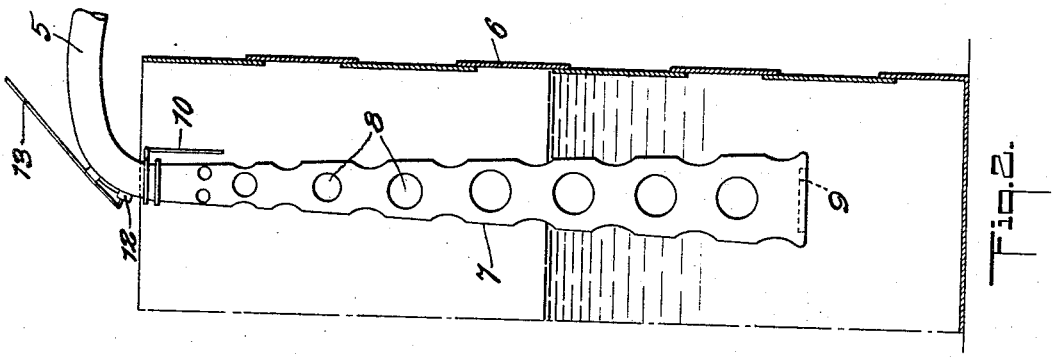
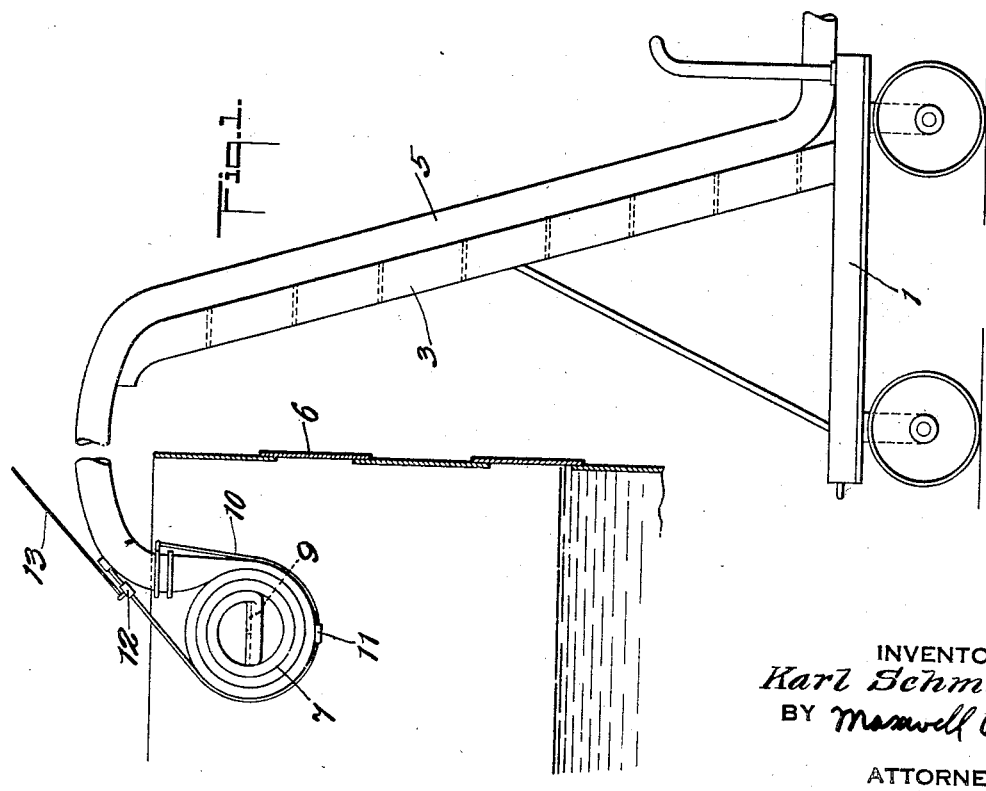
INVENTOR
*Karl Schmidt*
BY *Maxwell Barus*
ATTORNEY Patented Oct. 3, 1933

1,929,390

UNITED STATES PATENT OFFICE 1,929,390

FOAM DELIVERY APPARATUS

Karl Schmidt, Neuruppin (Mark), Germany, assignor to Pyrene-Minimax Corporation, a corporation of Delaware Application May 13, 1930, Serial No. 451,902, and in Germany January 17, 1929

10 Claims. (Cl. 169—4)

The present invention relates to fire fighting apparatus and has for an object to provide improved means for delivering fire foam downwardly onto the surface of a liquid without disturbing said liquid. This is a continuation in part of my copending application Serial Number 384,187 filed August 7, 1929 for improvements in Foam delivery apparatus.

When delivering foam onto the surface of oil, for example in a tank which has caught fire, it is desirable that the foam should flow onto the surface of the oil with as little force as possible in order that it may not stir up the oil or cause spattering thereof and in order that the foam may not be destroyed by mixing with the oil.

It is possible to flow the foam against the side of the tank and if the tank walls are suitably shaped and if conditions are otherwise favorable this method of introducing the foam down into the tank may serve. Under some conditions, however, due to irregularity of the shape of the tank walls or the heat of said walls this method is not effective.

The present invention provides an apparatus which can be introduced into an oil tank over the upper edge thereof for flowing the foam to the surface of the oil in such manner that the quality of the foam is maintained and the surface of the oil is not disturbed. A feature of the invention is the portability of the equipment which enables it to be shifted about for use wherever required. In this way the separate installation of permanent equipment in each of a plurality of tanks or the like may be obviated.

The nature and objects of the invention will be better understood from a description of a particular illustrative embodiment for the purpose of which description reference should be had to the accompanying drawing forming a part hereof and in which Figure 1 is a side view of a portable foam generating and delivery apparatus constructed in accordance with the invention showing the flexible tubular member in folded relation, Figure 2 is a side view of a portion of the same showing one form of the tubular member in extended position and Figure 3 is a view similar to Figure 2 but showing a modified form of tubular member in extended position.

The structure shown for the purposes of illustrating the invention comprises a cart 1 of any suitable form mounted on wheels and adapted to be moved about to any desired points of use. A supporting frame or standard 3 of any appropriate construction is mounted on the cart and is adapted to support a foam delivery pipe 5 which may extend over the side wall of an oil tank 6 for delivering fire foam onto the surface of oil in the tank. The frame 3 may advantageously be in the form of a ladder as shown. Any suitable type of foam generating system may be appropriately connected with the pipe for delivery of the foam into the tank. In order to prevent spattering and destruction of the oil, a flexible tubular member 7 is connected to the discharge end of the pipe 5 and is arranged to lead the foam to the surface of the liquid and there to discharge it over the surface of the liquid in a stream. The flexible conduit 7 is preferably made of asbestos or other combustion resisting material. In order that the foam may be discharged at the surface of the liquid regardless of the depth of the liquid in the tank at the time of discharge, the tubular member is provided with a plurality of apertures 8 distributed along its length from the highest point of probable liquid level to the lower end of the tube. Preferably the tube is tapered downwardly in order that the velocity of the foam may be reduced toward the level of the liquid as the tube enlarges. A weight 9 of suitable magnitude is preferably affixed to the free end of the tubular member for the purpose of extending the hose and carrying its free end into the liquid when released in the manner to be explained.

The tubular member is shown as folded or rolled as indicated in Figure 1 and supported in position above the liquid level by a suitable releasable connection which may for example be in the form of a cord 10. Preferably a fusible link 11 is provided in the flexible connection to permit immediate release in case of fire. To facilitate release of the flexible member at will a catch 12 may also be provided in the flexible connection 10 together with a cord 13 connected thereto and extending to a point where it can be conveniently reached by an operative. This cord is so connected to the catch 12 as to operate to release the same and drop the flexible conduit. Where the apparatus is of the portable type and intended for use in connection with a number of different tanks it will be understood that the pipe 5 and its support will extend upwardly to a sufficient extent to permit the rolled hose 7 to be carried over the edge of the tank. Obviously this rolled hose construction may be utilized either in connection with a portable or a stationary fire foam system.

In Figure 3 there is shown a modified construction of the flexible tubular member. In lieu of providing this member with a series of substantially circular openings it may be formed with a series of elongated longitudinally disposed slits 15. Under the action of the weight 16 at the lower end of the member there is a tendency to hold all of these slits closed. However as the foam passes downwardly within the conduit and strikes either the lower end of the same or the surface of the oil or other liquid in the conduit the back pressure created will serve to force open the slits which are just above the surface of the oil in the tank so that the foam will be discharged through these openings and will spread over the surface of the oil. This form of conduit is more effective than the type shown in Figure 2 since with the provision of the round or similar openings the foam will be discharged not only at the surface of the liquid in the tank but also at points higher up along the flexible conduit. Foam which is discharged at some distance from the burning surface will be considerably less effective than that discharged right at the surface since the action of the heat and gases will tend to destroy it or carry it away before it has an opportunity to smother the flames. The provision of the slits in lieu of the round openings insures the discharge of the foam only at the surface of the oil. Furthermore the slits occupy a much smaller area of the surface of the conduit and therefore do not serve to weaken the latter to the same extent as the regular openings.

The foregoing particular description is illustrative merely and is not intended as defining the limits of the invention.

I claim:

1. In apparatus for delivering fire foam vertically downward onto the surface of the liquid, the combination with a foam delivery pipe of a flexible tubular member depending therefrom said member being adapted to be rolled up when not in use and having lateral apertures distributed along its length for the discharge of foam when extended.

2. In apparatus for delivering fire foam vertically downward onto the surface of the liquid, the combination with a foam delivery pipe of a flexible tubular member depending therefrom and having a number of lateral apertures distributed along its length, said tubular member being enlarged toward its lower end.

3. In apparatus for delivering fire foam vertically downward onto the surface of the liquid, the combination with a foam delivery pipe of a flared flexible tubular member depending therefrom and having apertures distributed along its length.

4. In apparatus for delivering fire foam vertically downward onto the surface of the liquid, the combination with a foam delivery pipe of a flexible tubular member having lateral apertures connected thereto and releasable means for supporting said tubular member in folded relation.

5. In apparatus for delivering fire foam vertically downward onto the surface of the liquid, the combination with a foam delivery pipe of a flexible tubular member having lateral apertures connected thereto and releasable means for supporting said tubular member in folded relation together with a weight secured to the end of the tubular member.

6. In apparatus for delivering fire foam at the surface of a liquid a foam delivery pipe and a flexible conduit connected to said pipe and depending into the liquid, said conduit being provided with a plurality of elongated slits forming normally closed apertures to be opened upon the building up of pressure adjacent thereto within said conduit.

7. In apparatus for delivering fire foam at the surface of a liquid a foam delivery pipe and a flexible conduit connected to said pipe and depending into the liquid, said conduit being provided with a plurality of elongated slits and tensioning means adapted to hold said slits closed.

8. In apparatus for delivering fire foam at the surface of a liquid, a portable foam generator, a delivery pipe connected to said generator, a flexible conduit connected to said delivery pipe, said conduit having discharge openings therein along its sides, and releasable means for normally holding said conduit above the surface of the liquid.

9. In apparatus for delivering fire foam at the surface of a liquid a portable foam generator, a delivery pipe connected to said generator, a flexible conduit connected to said delivery pipe, said conduit having a plurality of elongated slits along its sides, releasable means for normally holding said conduit above the surface of the liquid, and tensioning means adapted to carry said conduit into the liquid when released, said tensioning means tending to hold said slits closed.

10. In apparatus for delivering fire foam vertically downward onto the surface of the liquid, the combination with a foam delivery pipe of a flexible, asbestos, tubular member connected thereto, said member being compacted when not in use to reduce its length and arranged to have its free end dropped into the liquid, said member having lateral apertures along its length for discharge of foam.

KARL SCHMIDT.